United States Patent [19]

Hanlon et al.

[11] Patent Number: 5,076,814
[45] Date of Patent: Dec. 31, 1991

[54] STABILIZER COMPOSITIONS

[75] Inventors: J. Vincent Hanlon, St. Louis, Mo.; Scott A. Culley, Baton Rouge, La.

[73] Assignee: Ethyl Corporation, Richmond, Va.

[21] Appl. No.: 622,648

[22] Filed: Dec. 5, 1990

Related U.S. Application Data

[62] Division of Ser. No. 432,164, Nov. 6, 1989.

[51] Int. Cl.⁵ .............................................. C10L 1/18
[52] U.S. Cl. ...................................... 44/450; 252/407
[58] Field of Search ........................................... 44/450

[56] References Cited

U.S. PATENT DOCUMENTS 2,841,623  7/1958  Norton et al. ...................... 260/624
3,166,509  1/1965  Ecke et al. ............................ 44/450
4,011,057  3/1977  Sayers ................................... 44/450

Primary Examiner—Prince E. Willis
Assistant Examiner—Ellen McAvoy
Attorney, Agent, or Firm—J. F. Sieberth

[57] ABSTRACT

Liquid mixtures of alkyl phenols composed of from 1 to 8 wt % of 2-tert-butylphenol; from 4 to 12 wt % of 2,6-di-tert-butylphenol; from 4 to 12 wt % of 2-tert-butyl-4-n-butylphenol; from 4 to 12 wt % of 2,4,6-tri-tert-butylphenol; and from 65 to 89 wt % of 2,6-di-tert-butyl-4-n-butylphenol having a balance of properties rendering them ideally suited for use as stabilizers for middle distillate fuels. Such mixtures can be readily produced by an aldehyde-catalytzed alkylation procedure using n-butanol, an appropriate mixture of tertiary butylated phenols, and a strong base (e.g., NaOH, KOH, etc.).

20 Claims, No Drawings

STABILIZER COMPOSITIONS

This application is a division of application Ser. No. 432,164, filed Nov. 6, 1989, now allowed.

TECHNICAL FIELD

This invention relates to novel and useful compositions of matter. More particularly it relates to antioxidants for petroleum-derived fuels, lubricants and functional fluids.

BACKGROUND

Fuels such as gasoline, diesel fuel, fuel oil, jet fuel, and kerosene tend to undergo oxidative deterioration during storage whereby solid deposits, gums, or sludge may form in the fuel. Obviously the formation of such materials is detrimental.

Similarly, lubricants and functional fluids such as crankcase lubricating oil, gear oil, electrical insulating oil, spindle oil, automatic transmission fluids, hydraulic fluids, and the like usually require protection against oxidative degradation. In such substrates, premature oxidative deterioration manifests itself in a change in viscosity (usually an increase in viscosity) or an increase in acid number. Such effects are likewise detrimental.

THE INVENTION

This invention provides new compositions of matter which possess a combination of properties rendering them ideally suited for use as antioxidants in fuels, lubricants and functional fluids. Additionally this invention provides fuel, lubricant and functional fluid compositions comprising a major proportion of a liquid fuel or a lubricating oil or a functional fluid normally tending to undergo gradual oxidative deterioration or degradation on exposure to air containing a minor amount, sufficient to inhibit such deterioration, of an antioxidant composition of this invention.

In accordance with one embodiment of this invention there is provided a liquid mixture of alkyl phenols consisting essentially of:

a) from 1 to 8 wt % of 2-tert-butylphenol;
b) from 4 to 12 wt % of 2,6-di-tert-butylphenol;
c) from 4 to 12 wt % of 2-tert-butyl-4-n-butylphenol;
d) from 4 to 12 wt % of 2,4,6-tri-tert-butylphenol; and
e) from 65 to 80 wt % of 2,6-di-tert-butyl-4-n-butylphenol.

Such mixtures are useful as oxidation inhibitors (antioxidants) and as thermal stabilizers for turbine fuels. Moreover such mixtures have an excellent balance of physical properties rendering them of particular usefulness as antioxidants for fuels, lubricants and functional fluids. For example they have extremely low freezing points, many such mixtures showing no evidence of crystal formation at temperatures as low as $-80°$ C. Moreover their viscosities are well-suited for these uses. Many such mixtures have viscosities below 1300 centistokes (cST) at $0°$ C., below 100 cST at $25°$ C., and below 10 cST at $100°$ C. Such mixtures have suitably high boiling temperatures and extremely low water solubilities. And, they are not only highly soluble in all conventional types of gasolines, middle distillate fuels, mineral lubricating oils and hydrocarbon-based functional fluids, but dissolve in them rapidly without need for an ancillary diluent or carrier.

It is interesting to note that the alkyl phenol mixtures of this invention are composed of several components which do not themselves have physical properties of the mixtures. For example 2,6-di-tert-butylphenol is a solid at room temperature with a melting point of $37°$-$39°$ C., and 2,4,6-tri-tert-butylphenol is a solid that does not melt until a temperature of about $129°$-$132°$ C. is reached. While 2-tert-butylphenol is a liquid at room temperature, it solidifies at $-6°$ or $-7°$ C.

In a preferred embodiment of this invention, there is provided a liquid mixture of alkyl phenols consisting essentially of:

a) from 1 to 8 wt % of 2-tert-butylphenol;
b) from 6 to 10 wt % of 2,6-di-tert-butylphenol;
c) from 6 to 10 wt % of 2-tert-butyl-4-n-butylphenol;
d) from 6 to 10 wt % of 2,4,6-tri-tert-butylphenol; and
e) from 65 to 75 wt % of 2,6-di-tert-butyl-4-n-butylphenol.

The above mixtures can be readily formed either by blending together the individual components singly and/or in various sub-combinations or by butylating an appropriate mixture of tertiary butyl phenols. When in their concentrated form (i.e., when not diluted with an ancillary solvent, diluent or carrier), the above mixture of alkyl phenols ordinarily will contain no more than about 8% of other components resulting either from the carry-over of impurities in the initial tertiary butyl phenol mixture or from by-product formation during the butylation process, or from a combination of these potential sources of impurities. In most cases these impurities are themselves phenolic species, and in any event, there is no evidence indicating that their presence is deleterious or that they detract from the efficacy of the compositions as antioxidants for fuels, lubricants and functional fluids. While it is possible to prepare essentially pure mixtures by blending together highly pure components a) through e) in the proportions above stated, or by rigorously purifying the butylation product, such procedures are time-consuming and expensive, and thus less desirable.

Gasoline and middle distillate fuels (i.e., diesel fuel, turbine fuel, burner fuel, kerosene, etc.) containing stabilizing quantities of the above components a) through e) inclusive in the relative proportions specified above constitute additional embodiments of this invention. Such fuel compositions may be formed by blending the individual components into the fuel either singly and/or in various sub-combinations. However it is much preferred to blend the components with the fuel collectively in the form of the above-identified mixtures consisting essentially of components a) through e) inclusive, as this takes advantage of the mutual solubilizing effect these components exert upon each other, and is a much simpler and less costly operation. While there is ordinarily no advantage in doing so, the mixtures of this invention may be admixed with a diluent, solvent or carrier before blending them with the fuel.

Lubricants (e.g., mineral lubricating oils and greases) and functional fluids (e.g., hydraulic fluids, automatic transmission fluids, electrical insulating oils, etc.) containing stabilizing quantities of the above components a) through e) inclusive in the relative proportions specified above constitute still further embodiments of this invention. Such compositions may be formed by blending the individual components into the base oil either singly and/or in various sub-combinations. However it is preferable to blend such composition into the base oil in the form of a mixture or concentrate containing components a) through e) in the proportions specified above. Such mixture or concentrate may also contain suitable proportions of other additives of the type commonly employed in lubricants or functional fluids, such as dispersants, viscosity index improvers, extreme pressure agents, antiwear additives, rust inhibitors, and the like.

The concentrations in which the antioxidant mixtures of this invention are employed in the fuels can be varied over a very wide range. Ordinarily the amount used will be somewhat above the minimum quantity required to confer the desired stability levels upon the particular fuel used so that the fuel will have an added measure of protection above the minimum needed. Conversely it is usually desirable to refrain from using a substantial excess of the stabilizer over that required for the particular fuel under the service conditions in which it is to be used, as this would simply add to the cost of the fuel. Generally speaking, the fuels will normally contain an amount of the antioxidant mixture falling in the range of from about 1 to about 20 pounds per thousand barrels (ptb), with amounts in the range of about 1 to about 5 ptb being preferred. Such quantities are normally sufficient to reduce the amount of oxidative degradation that occurs in a given distillate fuel as compared to amount of degradation that occurs under the same conditions with the same fuel composition absent an antioxidant additive composition of this invention. However with exceptionally unstable fuels or with fuels used under particularly severe service conditions, even higher concentrations should be used.

In the case of the hydrocarbon-based lubricating oils and soap-thickened lubricating greases of this invention, the antioxidant mixtures of this invention are generally present in an amount in the range of about 0.1 to about 2.5 weight percent, with amounts in the range of about 0.2 to about 1.0 weight percent being preferred. Here again departures from these ranges can be utilized whenever the circumstances warrant or justify or indicate the desirability of such departures. Similar concentrations of the antioxidants of this invention are employed in the functional fluids of this invention with departures from such ranges of concentration being entirely permissible whenever indicated or desired.

Another feature of this invention is that antioxidant mixtures as described above can be readily produced by an aldehyde-catalyzed alkylation procedure using n-butanol, an appropriate mixture of tertiary butylated phenols, and a strong base (e.g., NaOH, KOH, etc.).

The following example in which all parts and percentages are by weight is illustrative of the invention.

EXAMPLE

A Hastelloy autoclave is charged with 40 parts KOH; 250 parts of a mixture composed of about 6% of 2-tert-butylphenol, about 83% of 2,6-di-tert-butylphenol and about 11% of 2,4,6-tri-tert-butylphenol; and 190 parts of n-butyl alcohol containing 11 parts of added butyraldehyde. The autoclave is sparged with nitrogen, sealed and heated to 235° C. for 9 hours. The product is washed with water (preferably about 5 times using 100 parts of water each time) and the low boiling components are removed in vacuo at about 25 mm Hg and 150° C. The residual product contains the following components in the following approximate proportions:
a) 2-tert-butylphenol: 3%
b) 2,6-di-tert-butylphenol: 8%
c) 2-tert-butyl-4-n-butylphenol: 8%
d) 2,4,6-tri-tert-butylphenol: 8%
e) 2,6-di-tert-butyl-4-n-butylphenol: 68%
f) 4,4'-butylidenebis(2,6-di-tert-butylphenol): 1%
g) Other: 4%

Such a product showed no evidence of crystallization at −80° C., and its viscosity was 1170 cST at 0° C., 70.3 cST at 25° C., and 2.9 cST at 100° C.

When forming the mixtures of this invention by blending together the components thereof (or subcombinations thereof), such components may be produced by use of alkylation procedures such as are described in U.S. Pat. Nos. 2,831,333 and 3,919,333. The components can be isolated in suitably pure form by fractional distillation at reduced pressures, by use of solvent extraction procedures, or by use of column chromatography.

Gasolines are usually blends of various mixtures of paraffins, naphthenes, aromatics and/or olefins boiling within the gasoline boiling range. Ordinarily, the olefinic components tend to be the most readily susceptible to oxidative deterioration on exposure to air, although other gasoline components can also undergo some oxidative degradation during storage.

The gasoline compositions of this invention may contain other common materials such as carburetor detergents, upper cylinder lubricants, deicers, octane improvers, dyes, blending components, such as methanol, ethanol, methyl tert-butyl ether, tert-butyl acetate, and like components.

As is well known, middle distillate fuels are derived predominantly from petroleum sources and generally have boiling points within the range of from about 160° to about 370° C. The fuels are often referred to as middle distillate fuels since they comprise the fractions which distill after gasoline. Such fuels include jet fuels, kerosene, heating oils, diesel fuels, turbine fuels and the like.

The middle distillate fuel compositions of this invention may contain any of a variety of other additives in their customary concentrations for their customary purposes. For example, the fuels of this invention may contain conventional quantities of such conventional additives as combustion or cetane improvers, friction modifiers, detergents, dyes, other antioxidants or stabilizers, and the like. Similarly the fuels may contain suitable minor amounts of conventional fuel blending components such as methanol, ethanol, dialkyl ethers, and the like.

As noted above, the antioxidants can also be employed in mineral oils, in soap-thickened lubricating greases, in hydraulic fluids, transmission fluids, gear oils, transformer oils, and the like. These materials are primarily based on petroleum-derived hydrocarbons, but this invention is also applicable to use of the antioxidant mixtures in synthetic lubricants and functional fluids so long as such synthetic oils or fluids are normally susceptible to oxidative deterioration when exposed to air during storage and/or during service conditions. Any of the lubricant or functional fluid compositions of this invention may contain conventional amounts of conventionally-used additives such as dispersants (both metal-containing or ashless), VI improvers, extreme pressure additives, antiwear agents, antirust additives, etc.

The antioxidant compositions of this invention can also be used in quenching oils, cutting oils, heat exchange fuels, etc.

This invention is susceptible to considerable variation in its practice within the spirit and scope of the ensuing claims.

What is claimed is:

1. A liquid hydrocarbon fuel containing a minor antioxidant quantity of a mixture of alkyl phenols consisting essentially of:
   a) from 1 to 8 wt % of 2-tert-butylphenol;
   b) from 4 to 12 wt % of 2,6-di-tert-butylphenol;
   c) from 4 to 12 wt % of 2-tert-butyl-4-n-butylphenol;
   d) from 4 to 12 wt % of 2,4,6-tri-tert-butylphenol; and
   e) from 65 to 80 wt % of 2,6-di-tert-butyl-4-n-butylphenol.

2. A composition as claimed in claim 1 wherein said minor antioxidant quantity is in the range of about 1 to about 20 pounds per thousand barrels.

3. A composition as claimed in claim 1 wherein said minor antioxidant quantity is in the range of about 1 to about 5 pounds per thousand barrels.

4. A composition as claimed in claim 1 wherein said liquid hydrocarbon fuel is a gasoline.

5. A composition as claimed in claim 1 wherein said liquid hydrocarbon fuel is a middle distillate fuel.

6. A composition as claimed in claim 1 wherein said liquid hydrocarbon fuel is a gasoline and wherein said minor antioxidant quantity is in the range of about 1 to about 20 pounds per thousand barrels.

7. A composition as claimed in claim 1 wherein said liquid hydrocarbon fuel is a gasoline and wherein said minor antioxidant quantity is in the range of about 1 to about 5 pounds per thousand barrels.

8. A composition as claimed in claim 1 wherein said liquid hydrocarbon fuel is a middle distillate fuel and wherein said minor antioxidant quantity is in the range of about 1 to about 20 pounds per thousand barrels.

9. A composition as claimed in claim 1 wherein said liquid hydrocarbon fuel is a middle distillate fuel and wherein said minor antioxidant quantity is in the range of about 1 to about 5 pounds per thousand barrels.

10. A liquid hydrocarbon fuel containing a minor antioxidant quantity of a mixture of alkyl phenols consisting essentially of:
    a) from 1 to 8 wt % of 2-tert-butylphenol;
    b) from 6 to 10 wt % of 2,6-di-tert-butylphenol;
    c) from 6 to 10 wt % of 2-tert-butyl-4-n-butylphenol;
    d) from 6 to 10 wt % of 2,4,6-tri-tert-butylphenol; and
    e) from 65 to 75 wt % of 2,6-di-tert-butyl-4-n-butylphenol.

11. A composition as claimed in claim 10 wherein said minor antioxidant quantity is in the range of about 1 to about 20 pounds per thousand barrels.

12. A composition as claimed in claim 10 wherein said minor antioxidant quantity is in the range of about 1 to about 5 pounds per thousand barrels.

13. A composition as claimed in claim 10 wherein said liquid hydrocarbon fuel is a gasoline.

14. A composition as claimed in claim 10 wherein said liquid hydrocarbon fuel is a middle distillate fuel.

15. A composition as claimed in claim 10 wherein said liquid hydrocarbon fuel is a gasoline and wherein said minor antioxidant quantity is in the range of about 1 to about 20 pounds per thousand barrels.

16. A composition as claimed in claim 10 wherein said liquid hydrocarbon fuel is a gasoline and wherein said minor antioxidant quantity is in the range of about 1 to about 5 pounds per thousand barrels.

17. A composition as claimed in claim 10 wherein said liquid hydrocarbon fuel is a middle distillate fuel and wherein said minor antioxidant quantity is in the range of about 1 to about 20 pounds per thousand barrels.

18. A composition as claimed in claim 10 wherein said liquid hydrocarbon fuel is a middle distillate fuel and wherein said minor antioxidant quantity is in the range of about 1 to about 5 pounds per thousand barrels.

19. A liquid hydrocarbon fuel containing a minor antioxidant quantity of a mixture of alkyl phenols consisting essentially of the following components in the following approximate proportions:
    a) 2-tert-butylphenol: 3%
    b) 2,6-di-tert-butylphenol: 8%
    c) 2-tert-butyl-4-n-butylphenol: 8%
    d) 2,4,6-tri-tert-butylphenol: 8%
    e) 2,6-di-tert-butyl-4-n-butylphenol: 68%
    f) 4,4'-butylidenebis(2,6-di-tert-butylphenol): 1%
    g) Other: 4%
said mixture having prior to being blended with said fuel having viscosities below 1300 centistokes at 0° C., below 100 centistokes at 25° C., and below 10 centistokes at 100° C.

20. A composition as claimed in claim 19, wherein said antioxidant quantity is in the range of about 1 to about 20 pounds per thousand barrels.

* * * * *

UNITED STATES PATENT AND TRADEMARK OFFICE
CERTIFICATE OF CORRECTION

PATENT NO. : 5,076,814

DATED : DECEMBER 31, 1991

INVENTOR(S) : J. VINCENT HANLON, SCOTT A. CULLEY

It is certified that error appears in the above-identified patent and that said Letters Patent is hereby corrected as shown below: On the title page Line 5, of the Abstract- change "89" to --80--.

Signed and Sealed this

Twentieth Day of April, 1993

Attest:

MICHAEL K. KIRK

*Attesting Officer*  *Acting Commissioner of Patents and Trademarks*